United States Patent
Wang et al.

(10) Patent No.: US 11,095,861 B2
(45) Date of Patent: *Aug. 17, 2021

(54) PROJECTOR AND METHOD FOR PROJECTING IMAGE LIGHT BEAM

(71) Applicant: Coretronic Corporation, Hsin-Chu (TW)

(72) Inventors: Chih-Ming Wang, Hsin-Chu (TW); Ming-Cheng Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/861,227

(22) Filed: Apr. 29, 2020

(65) Prior Publication Data

US 2020/0260059 A1    Aug. 13, 2020

Related U.S. Application Data

(63) Continuation-in-part of application No. 16/262,928, filed on Jan. 31, 2019, now Pat. No. 10,986,320.

(Continued)

(51) Int. Cl.
*G09G 5/02* (2006.01)
*H04N 9/31* (2006.01)
(Continued)

(52) U.S. Cl.
CPC ......... *H04N 9/3182* (2013.01); *H04N 9/3102* (2013.01); *H04N 9/3197* (2013.01); *H04N 9/67* (2013.01); *H04N 9/69* (2013.01)

(58) Field of Classification Search
CPC .... G09G 5/02; G09G 5/06; G09G 2320/0666; G09G 2340/06; G06T 11/001
(Continued)

(56) References Cited

U.S. PATENT DOCUMENTS

2008/0259231 A1* 10/2008 Miyazawa ............. G09G 3/002
349/8
2016/0044277 A1    2/2016 Oh et al.
(Continued)

FOREIGN PATENT DOCUMENTS

CN    106791744    5/2017
CN    108352059    7/2018
(Continued)

OTHER PUBLICATIONS

"Office Action of U.S. Appl. No. 16/262,928", dated Jun. 2, 2020, pp. 1-25.

(Continued)

*Primary Examiner* — Gordon G Liu
(74) *Attorney, Agent, or Firm* — JCIPRNET

(57) ABSTRACT

A projector and a method for projecting an image light beam according to an image signal are provided. The method includes: receiving the image signal; decoding the image signal to obtain a metadata of the image signal; determining whether the image signal is a HLG-HDR signal according to the metadata; converting a color space of the image signal from a wider color gamut to a narrower color gamut in response to the image signal is the HLG-HDR signal so as to generate a converted image signal; performing a gamma correction on the converted image signal according to the metadata to generate a corrected image signal; transferring the corrected image signal into an optical signal; providing a light beam; respectively modulating the light beam and a illumination beam according to the optical signal to form an image light beam; and projecting the image light beam.

12 Claims, 3 Drawing Sheets

Related U.S. Application Data

(60) Provisional application No. 62/863,246, filed on Jun. 18, 2019.

(51) Int. Cl.
   *H04N 9/67* (2006.01)
   *H04N 9/69* (2006.01)

(58) Field of Classification Search
   USPC .......................................................... 345/589
   See application file for complete search history.

(56) References Cited

U.S. PATENT DOCUMENTS

| | | | |
|---|---|---|---|
| 2016/0142714 A1* | 5/2016 | Toma | H04N 7/08 375/240.25 |
| 2016/0210730 A1 | 7/2016 | Eto et al. | |
| 2017/0324887 A1* | 11/2017 | Min | H04N 9/64 |
| 2018/0063500 A1 | 3/2018 | Rusanovskyy et al. | |
| 2018/0139429 A1 | 5/2018 | Park et al. | |
| 2019/0139201 A1* | 5/2019 | Eto | G06T 5/009 |
| 2019/0141229 A1 | 5/2019 | Kamiya et al. | |

FOREIGN PATENT DOCUMENTS

| | | |
|---|---|---|
| CN | 108882028 | 11/2018 |
| JP | 2018101863 | 6/2018 |

OTHER PUBLICATIONS

"Office Action of U.S. Appl. No. 16/262,928", dated Sep. 30, 2020, pp. 1-24.

Ultra HD Forum, "Phase A Guidelines: Revision: 1.1," Jul. 15, 2016, pp. 1-64.

"Search Report of Europe Counterpart Application", dated Oct. 30, 2020, p. 1-p. 10.

* cited by examiner

PROJECTOR AND METHOD FOR PROJECTING IMAGE LIGHT BEAM

CROSS-REFERENCE TO RELATED APPLICATION

This application is a continuation-in-part application of and claims the priority benefit of a prior application Ser. No. 16/262,928, filed on Jan. 31, 2019. This application also claims the priority benefit of U.S. provisional application Ser. No. 62/863,246, filed on Jun. 18, 2019. The entirety of each of the above-mentioned patent applications is hereby incorporated by reference herein and made a part of this specification.

BACKGROUND

Technical Field

The invention relates to a projector. More particularly, the invention relates to a projector and a method for projecting image light beam according to an image signal.

Description of Related Art

Along with the advancement of imaging technology, a large number of televisions are support for hybrid log-gamma high dynamic range imaging (HLG-HDR). Accordingly, more and more media content sources, such as DVD, Blu-ray, cable television, or cloud television, provide image signal with HLG-HDR class. Furthermore, more and more photographers use HLG-HDR-supported camera to take photos with high dynamic range. However, since currently the image processor (e.g., digital display processor (DDP)) of a lot of projectors do not support HLG-HDR class input signal, these projectors cannot project the image in a right way when the input image signal is in HLG-HDR class, and the projected image will be severely color shift. Otherwise, the user merely able to choose the projector supporting the HLG-HDR class image signals with the high price. As such, it is important to those skilled in the art to provide a method that can make an affordable projector able to display HLG-HDR images or non-HLG-HDR images in a proper way.

The information disclosed in this "BACKGROUND" section is only for enhancement of understanding of the background of the described technology and therefore it may contain information that does not form the prior art that is already known to a person of ordinary skill in the art. Further, the information disclosed in the "BACKGROUND" section does not mean that one or more problems to be resolved by one or more embodiments of the invention were acknowledged by a person of ordinary skill in the art.

SUMMARY

The invention provides a projector and a method capable of projecting, according to an image signal, an image light beam with a proper color gamut no matter what class the image signal is.

Other objectives and advantages of the invention can be further understood from the technical features disclosed in the invention.

In order to achieve one or a part or all of the above objectives or other objectives, an embodiment of the invention provides a projector for projecting an image light according to an image signal. The projector comprises a receiver, a processor, a light source module, a color conversion module, a light valve, and a projection lens. The receiver is configured to receive the image signal and decode the image signal to obtain a metadata of the image signal, to determine, according to the metadata, whether the image signal is a HLG-HDR signal, and to convert, in response to the image signal is the HLG-HDR signal, a color space of the image signal from a wider color gamut to a narrower color gamut so as to generate a converted image signal. The processor is coupled to the receiver and configured to perform, according to the metadata, a gamma correction on the converted image signal to generate a corrected image signal, and to transfer the corrected image signal into an optical signal. The light source module is coupled to the processor and providing a light beam. The color conversion module is coupled to the processor and disposed on a transmission path of the light beam, wherein the color conversion is configured to modulate, according to the optical signal, the light beam to an illumination beam. The light valve coupled to the processor and disposed on a transmission path of the illumination beam, wherein the light valve is configured to modulate, according to the optical signal, the light beam to form the image light beam. The projection lens is disposed on a transmission path of the image light beam and projecting the image light beam.

In order to achieve one or a part or all of the above objectives or other objectives, an embodiment of the invention provides a method for projecting an image light beam according to an image signal. The method comprises: receiving, by a receiver, the image signal; decoding, by the receiver, the image signal to obtain a metadata of the image signal; determining, by the receiver, whether the image signal is a HLG-HDR signal according to the metadata; converting, by the receiver, a color space of the image signal from a wider color gamut to a narrower color gamut in response to the image signal is the HLG-HDR signal so as to generate a converted image signal; performing, by a processor, a gamma correction on the converted image signal according to the metadata to generate a corrected image signal; transferring, by the processor, the corrected image signal into an optical signal; providing, by a light source module, a light beam; modulating, by a color conversion module, the light beam according to the optical signal to form the illumination beam; modulating, by a light valve, the illumination beam according to the optical signal to form the image light beam; and projecting, by a projection lens, the image light beam.

To sum up, the projector provided by the invention may determine the class of the image signal according to the metadata of the image signal and perform a proper gamma correction according to the class of the image signal so as to project a HLG-HDR-liked image light beam.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
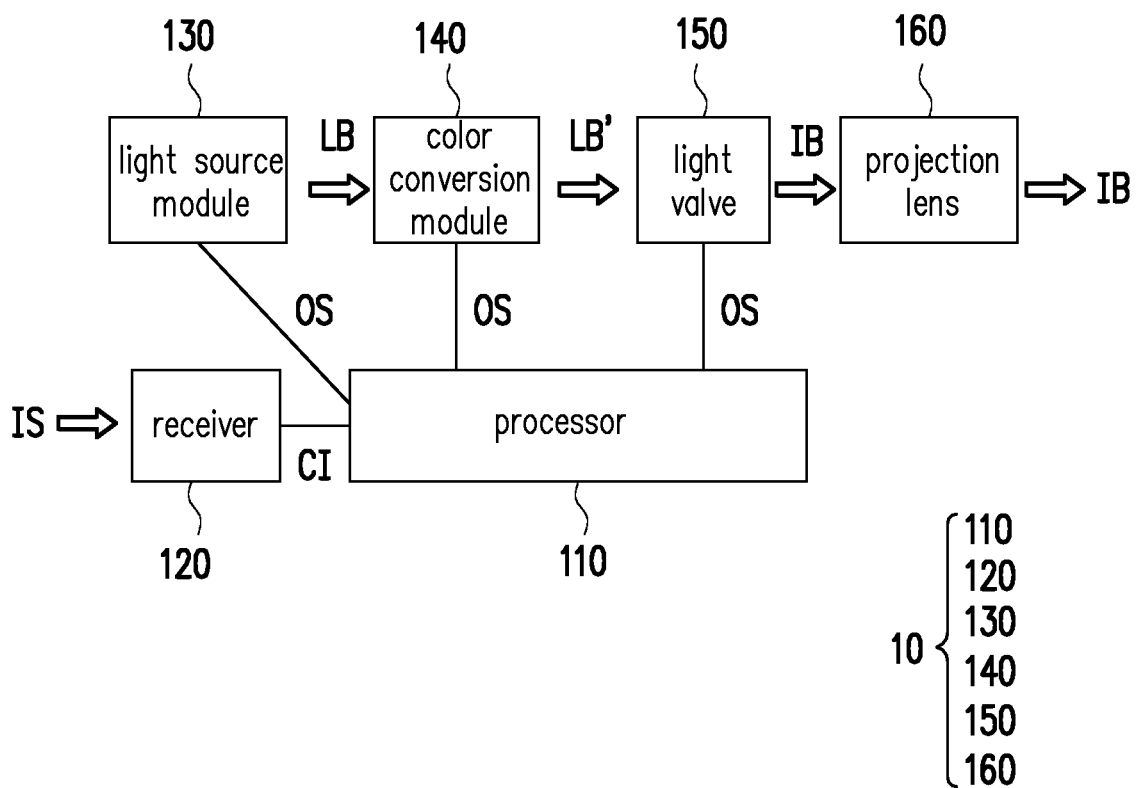
FIG. 1 is a block diagram illustrating a projector for projecting an image light beam according to an image signal according to an embodiment of the invention.

FIG. 1 is a block diagram illustrating a projector 10 for projecting an image light beam IB according to an image signal IS according to an embodiment of the invention. The projector may include a processor 110, a receiver 120, a light source module 130, a color conversion module 140, a light valve 150, and a projection lens 160.

The processor 110 is coupled to the receiver 120, the light source module 130, the color conversion module 140, and the light valve 150. The processor 110 may be, for example, a DDP, a central processing unit (CPU) or other programmable microprocessor for general or special use, a digital signal processor (DSP), a programmable controller, an application specific integrated circuit (ASIC), a graphics processing unit (GPU), or any other similar device or a combination of the foregoing devices. Nevertheless, the invention is not limited thereto.

The processor 110 may be configured to perform gamma correction on a converted image CI received from the receiver 120 to generate a corrected image signal, and to transfer said corrected image signal into an optical signal OS.

The receiver 120 may be, for example, a High Definition Multimedia Interface (HDMI) receiver. Nevertheless, the invention is not limited thereto. The receiver 120 may be configured to receive the image signal IS and decode the image signal IS to obtain a metadata of the image signal IS. In some embodiments, the metadata may indicate that the image signal IS is corresponded to standard dynamic range (SDR) or high dynamic range (HDR) class. More specifically, the HDR class signal may refer to HRD 10, Dolby vision HDR or HLG-HDR. For example, assuming that the image signal IS is in HDMI 2.0 format, then the metadata may be, for example, a Dynamic Range and Mastering InfoFrame as shown in Table 1, wherein the Dynamic Range and Mastering InfoFrame may include data such as a static metadata and may indicate an Electro-Optical Transfer Function (EOTF), corresponding to the image signal IS. As following shown, the static metadata may is represented by 3 bits, and the EOTF may is represented by 3 bits.

In some embodiment, the receiver 120 decodes the image signal IS and obtains a static metadata, a content-dependent metadata and a EOTF, and the processor 110 generates an optical signal without basing the content-dependent metadata. In some embodiment, the image signal IS may be a HLG-HDR class signal, the metadata decoded from the image signal IS may merely include the static metadata. That is, the metadata of the image signal IS with HLG-HDR class does not contain a content-dependent metadata.

TABLE 1

| InfoFrame Type Code | InfoFrame Type = 0x07 |
|---|---|
| InfoFrame Version number | Version = 0x01 |
| Length of InfoFrame | Length of following HDR Metadata InfoFrame |
| Data Byte 1 | F17 = 0  F16 = 0  F15 = 0  F14 = 0  F13 = 0  EOTF (3 bits) |
| Data Byte 2 | F27 = 0  F26 = 0  F25 = 0  F24 = 0  F23 = 0  Static_Metadata_Descriptor_ID (3 bits) |
| Data Byte 3 | Static_Metadata_Descriptor |
| ... | ... |
| Data Byte n | ... |

Furthermore, the metadata includes the EOTF as shown in Table 2, wherein Table 2 explains Data Byte 1 of the Dynamic Range and Mastering InfoFrame which identifies the EOTF used in the image signal IS.

TABLE 2

| Byte-value | EOTF used |
|---|---|
| 0 | Traditional gamma—SDR Luminance Range |
| 1 | Traditional gamma—HDR Luminance Range |
| 2 | SMPTE ST 2084 [40] |
| 3 | Hybrid Log-Gamma (HLG) based on ITU-R BT.2100-0 [50] |
| 4-7 | Reserved for future use |

Furthermore, the receiver 120 may be configured to determine, according to the metadata, whether the image signal IS is a HLG-HDR signal, and to convert, in response to the image signal IS is the HLG-HDR signal, a color space of the image signal IS from a wider color gamut to a narrower color gamut so as to generate the converted image signal CI. In some embodiment, the receiver 120 may be configured to convert, according to the EOTF, a color space of the image signal IS from a wider color gamut to a narrower color gamut so as to generate the converted image signal CI. That is, the converted image signal CI related to the image signal SI can be supported by the processor 110. For example, the receiver 120 may determine whether the color space of the image signal IS received by the receiver 120 corresponding to a wider color gamut (e.g., BT. 2020, 4K/8K Standard) which is not supported by the processor 110. If the image signal IS is the HLG-HDR signal corresponding to the wider color gamut which is not supported by the processor 110, the receiver 120 may convert, according to the metadata, the color space of the image signal IS from the wider color gamut to a narrower color gamut (e.g., BT. 709, BT. 2100, Current Full HD Standard), which is supported by the processor 110, so as to generate the converted image signal CI. To be more specific, the receiver 120 may converts the color space of the image signal IS from the wider color gamut to a narrower color gamut according to the EOTF which indicates that the image signal IS is the HLG-HDR signal. The detail operation of the processor 110 and the receiver 120 will be described below.

The light source module 130 is coupled to the processor 110 and providing a light beam LB. To be more specific, the processor 110 may be configured to turn on or turn off the light source module 130 so as to enable the light beam LB or disable the light beam LB. In one embodiment, the processor 110 may further control the brightness of the light source module 130 according to the optical signal OS. The light beam LB may be generated by at least a light lamp, a laser diode (LD), or a light-emitting diode (LED) disposed in the light source module 130. Nevertheless, the invention is not limited thereto.

Referring to FIG. 1, in the embodiment, the color conversion module 140 is coupled to the processor 110 and disposed on a transmission path of the light beam LB. The color conversion module 140 may be implemented by, for example, a phosphor wheel or a color wheel. The color conversion is configured to modulate, according to the optical signal, the light beam to an illumination beam LB'. Nevertheless, the invention is not limited thereto.

The light valve 150 is coupled to the processor 110 and disposed on the transmission path of an illumination beam LB', wherein the light valve 150 is configured to modulate, according to the optical signal OS received from the processor 110, the illumination beam LB' to form the image light beam IB. The light valve 150 may be implemented by, for example, a digital micromirror device (DMD), liquid crystal on silicon (LCoS), liquid crystal display (LCD), or an Eidophor's oil-file based system, even maybe a Grating light valve. Nevertheless, the invention is not limited thereto.

The projection lens 160 is disposed on a transmission path of the image light beam IB formed by the light valve 150. The projection lens 160 may project the image light beam IB.

Figure 2:
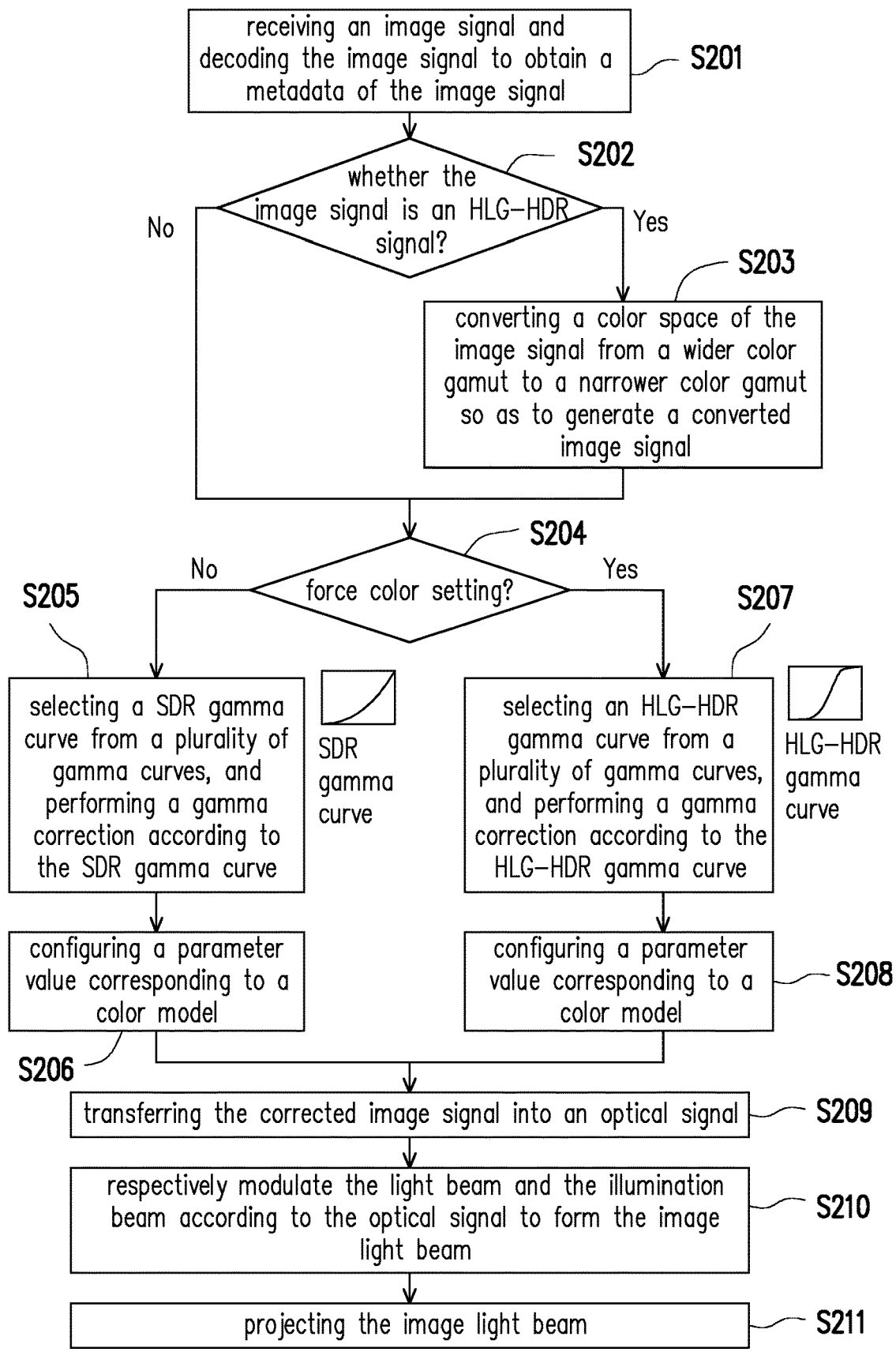
FIG. 2 is a flow chart illustrating a method for projecting an image light beam according to an image signal according to an embodiment of the invention.

FIG. 2 is a flow chart illustrating a method for projecting an image light beam IB according to an image signal IS according to an embodiment of the invention, wherein said method may be implemented by the projector 10 as illustrated in FIG. 1.

In step S201, the receiver 120 receives an image signal IS and decodes the image signal IS to obtain a metadata of the image signal, wherein the metadata indicates the image signal IS is corresponded to SDR, HDR, or HLG-HDR class. To be more specific, the metadata includes the EOTF corresponding to the image signal IS which indicates the image signal is corresponded to SDR, HDR, or HLG-HDR class.

In step S202, the receiver 120 determines whether the image signal IS is a HLG-HDR signal according to the EOTF. If the image signal IS is the HLG-HDR signal, that is, the image signal IS is corresponded to HLG-HDR class, proceed to step S203. Otherwise, proceed to step S204.

In step S203, the receiver 120 converts a color space of the image signal IS according to the metadata from a wider color gamut to a narrower color gamut so as to generate a converted image signal CI. For example, said wider color gamut may correspond to a color space related to the HLG-HDR class which is not supported by the processor 110, and said narrower color gamut may correspond to a color space related to the SDR class which is supported by the processor 110. In other words, the receiver 120 could convert the image signal IS corresponding to the HLG-HDR class which is not supported by the processor 110 to the converted image signal CI corresponding to the SDR class which is supported by the processor 110. In some embodiment, the receiver 120 converts a color space of the image signal IS from a wider color gamut to a narrower color gamut so as to generate a converted image signal CI, wherein the narrower color gamut may correspond to a color space related to and wider than the SDR class, and the narrower color gamut is still supported by the processor 110.

Is step S204, the processor 110 receives the converted signal CI related to the image signal IS from the receiver 120 and determines whether to force a color setting of the converted signal CI. If the processor 110 determines to force the color setting of the converted signal CI, proceed to step S207. Otherwise, proceed to step S205.

In the detail of forcing color operations, the processor 110 may determine whether to force a color setting of the converted signal CI according to the EOTF, and thus the processor 110 may further execute the calibrations on a gamma curve and a Hue-Saturation-Gain (HSG) color setting. For example, if the EOTF indicates that the converted signal CI related to the image signal IS is corresponded to the HLG-HDR class, the processor 110 determines to force the color setting of the converted signal CI to a color setting corresponding to a HLG-HDR gamma curve and a HDR HSG color setting, wherein the HSG color setting may be described in the form of Hue-Saturation-Lightness (HSL) color model, Hue-Saturation-value (HSV) model, or Color Coordinate Adjustment (CCA) model. However, if the EOTF indicates that the converted signal CI related to the image signal IS is corresponded to a SDR class or a non-HLG-HDR class, the processor 110 determines to configure the color setting of the converted signal CI to a color setting corresponding to a SDR gamma curve and a SDR HSG color setting. In some embodiment, the color model can be Luma plus chroma/chrominance other than Cylindrical transformations, such as YUV.

In some embodiments, the processor 110 may determine whether to force a color setting of the converted signal CI according to a default setting or a control command which is generated in response to an input operation performed by a user of the projector 10 through an input device. In some embodiment, parameters of the color setting of the converted signal CI are designed to corresponding with the hardware restriction of the projector 10, such as image brightness, contrast ratio, resolution, and/or color saturation e.g. . . . . Furthermore, parameters of the color setting of the converted signal CI is related to the hardware restrictions of the light source module 130, the color conversion module 140, and the light valve 150. Thus the processor 110 may control them based on the parameters, and able to display HLG-HDR images or non-HLG-HDR images in a proper way.

In step S205, the processor 110 selects a SDR gamma curve from a plurality of gamma curves, and performs, on the converted image signal CI, a gamma correction according to the SDR gamma curve, so as to generate a corrected image signal. In other words, the processor 110 performs a gamma correction on the converted image signal according to the metadata to generate a corrected image signal.

In step S206, the processor 110 configures a parameter value corresponding to a color model. In some embodiments, said color model corresponds to the SDR HSG color setting as shown in Table 3. In some embodiment, each gamma curve is corresponding to a color model. Nevertheless, the invention is not limited thereto. That is, the color space of the image signal IS will correspond to a color model, and the processor 110 configures the parameter value corresponding to the color model according to the electro-optical transfer function.

TABLE 3

SDR - HSG Color Setting

| Color | Red | Green | Blue | Yellow | Cyan | Magenta |
|---|---|---|---|---|---|---|
| Hue | 0.00 | 0.00 | 0.00 | 0.00 | 0.00 | 0.00 |
| Saturation | 1.00 | 1.00 | 1.00 | 1.00 | 1.00 | 1.00 |
| Gain | 1.00 | 1.00 | 1.00 | 1.00 | 1.00 | 1.00 |

In step S207, the processor 110 selects a HLG-HDR gamma curve from a plurality of gamma curves, and performs, on the converted image signal CI, a gamma correction according to the HLG-HDR gamma curve, so as to generate a corrected image signal.

In step S208, the processor 110 configures values of parameters corresponding to a color model. In some embodiments, said color model corresponds to the SDR HSG color setting as shown in Table 4. In some embodiment, each gamma curve is corresponding to a color model. Nevertheless, the invention is not limited thereto.

TABLE 4

HLG-HDR- HSG Color Setting

| Color | Red | Green | Blue | Yellow | Cyan | Magenta |
|---|---|---|---|---|---|---|
| Hue | −0.30 | 0.50 | 0.00 | −0.50 | −0.40 | 0.55 |
| Saturation | 1.70 | 1.80 | 1.30 | 1.50 | 1.80 | 1.60 |
| Gain | 1.02 | 1.02 | 1.02 | 1.30 | 1.50 | 1.30 |

In step S209, the processor 110 transfers the corrected image signal into an optical signal OS.

In step S210, the color conversion module 140 and the light valve 150 respectively modulate the light beam LB emitted by the light source module 130 and the illumination beam LB' according to the optical signal OS received from the processor 110, so as to form an image light beam IB.

In step S211, the projection lens 160 disposed on a transmission path of the image light beam IB projects the image light beam IB.

In view of the foregoing, the projector provided by the invention may determine the class of the image signal according to the metadata of the image signal. The projector is capable of converting a color space of the image signal to generate a converted image signal, selecting a gamma curve corresponding to the converted image signal, and performing a gamma correction on the converted image according to the gamma curve so as to project a HLG-HDR-liked image light beam. In this way, without raising the cost of the projector, the image light beam can be projected with a proper color gamut no matter what class the image signal is, and a projector which does not support HLG-HDR class can project a HLG-HDR-liked image light beam when the image signal is in HLG-HDR class, wherein the HLG-HDR-liked image light beam corresponds to a gamma curve similar to HLG-HDR class.

Figure 3:
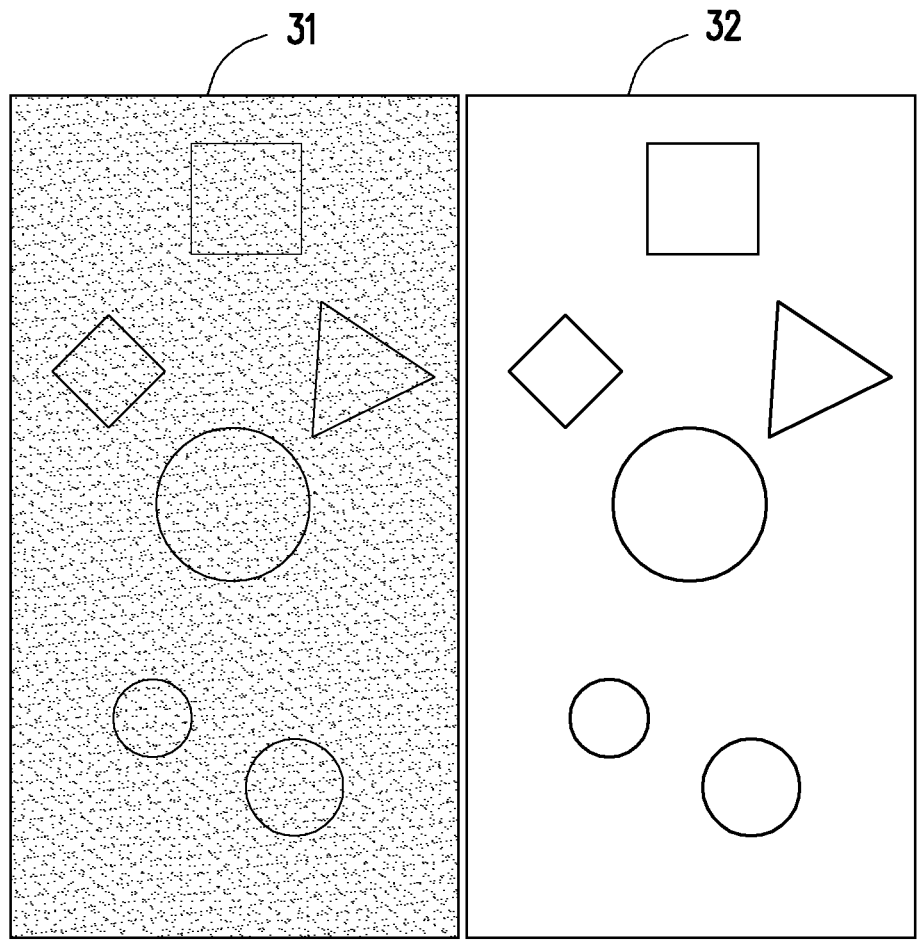
FIG. 3 is a schematic view illustrating a comparison between an image with HLG-HDR class projecting by a conventional DLP projector and an image with HLG-HDR class projecting by the projector as disclosed in the present invention.

FIG. 3 is a schematic view illustrating a comparison between an image with HLG-HDR class projecting by a conventional DLP projector (or projector does not support decoding an EOTF in a Dynamic Range and Mastering InfoFrame) and an image with HLG-HDR class projecting by the projector 10 as disclosed in the present invention. Since the conventional DLP projector cannot convert a color space or perform a gamma correction according to the EOTF, the conventional DLP projector will process the image signal with HLG-HDR class in a similar manner of processing the image signal with SDR class. Improperly processing of the image signal may significantly affect the performances of color and gray channels of the image light beam 31. Thereby, it seems like the image light beam 31 is covered by fog. On the contrary, the image light beam 32 projecting by the projector 10 converts a color space and performs a gamma correction on the image signal with HLG-HDR class according to the EOTF. Thereby, the projector 10 can project the HLG-HDR-liked image light beam 32 the performances of color and gray channels of which are as good as the image light beam projected by a HLG-HDR-supported projector.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector for projecting an image light beam according to an image signal, comprising:
   a receiver configured to:
   receive the image signal and decode the image signal to obtain a metadata of the image signal;
   determine, according to the metadata, whether the image signal is a hybrid log-gamma high dynamic range imaging (HLG-HDR) signal; and
   convert, in response to the image signal being the HLG-HDR signal, a color space of the image signal from a wider color gamut to a narrower color gamut so as to generate a converted image signal, and not convert, in response to the image signal not being the HLG-HDR signal, the color space;
   a processor coupled to the receiver and configured to:
   perform, according to the metadata, a gamma correction on the converted image signal to generate a corrected image signal; and
   transfer the corrected image signal into an optical signal;
   a light source module coupled to the processor and providing a light beam;
   a color conversion module coupled to the processor and disposed on a transmission path of the light beam, wherein the color conversion module is configured to modulate, according to the optical signal, the light beam to an illumination beam;
   a light valve coupled to the processor and disposed on a transmission path of the illumination beam, wherein the light valve is configured to modulate, according to the optical signal, the illumination beam to form the image light beam; and
   a projection lens, disposed on a transmission path of the image light beam and projecting the image light beam,
   wherein the processor is configured to select a gamma curve corresponding to the metadata from a plurality of gamma curves according to an electro-optical transfer function, and to perform the gamma correction according to the selected gamma curve.

2. The projector for projecting the image light beam according to the image signal of claim 1, wherein the metadata includes a static metadata and includes an electro-optical transfer function corresponding to the image signal.

3. The projector for projecting the image beam according to the image signal of claim 2, wherein the metadata indicates that the image signal is corresponded to SDR, HDR or HLG-HDR class.

4. The projector for projecting the image light beam according to the image signal of claim 2, wherein the receiver converts the color space of the image signal from the wider color gamut to the narrower color gamut according to the electro-optical transfer function.

5. The projector for projecting the image light beam according to the image signal of claim 2, wherein the processor selects a gamma curve from a plurality of gamma curves according to the electro-optical transfer function, and performs the gamma correction according to the gamma curve.

6. The projector for projecting the image light beam according to the image signal of claim 2, wherein the color space corresponds to a color model, and the processor configures a parameter value corresponding to the color model according to the electro-optical transfer function.

7. A method for projecting an image light beam according to an image signal, comprising:
   receiving, by a receiver, the image signal;
   decoding, by the receiver, the image signal to obtain a metadata of the image signal;
   determining, by the receiver, whether the image signal is a hybrid log-gamma high dynamic range imaging (HLG-HDR) signal according to the metadata;
   converting, by the receiver, a color space of the image signal from a wider color gamut to a narrower color gamut in response to the image signal being the HLG-HDR signal so as to generate a converted image signal, and not converting, in response to the image signal not being the HLG-HDR signal, the color space;
   performing, by a processor, a gamma correction on the converted image signal according to the metadata to generate a corrected image signal;
   transferring, by the processor, the corrected image signal into an optical signal;
   providing, by a light source module, a light beam;
   modulating, by a color conversion module, the light beam according to the optical signal to form the illumination beam;
   modulating, by a light valve, the illumination beam according to the optical signal to form the image light beam; and
   projecting, by a projection lens, the image light beam,
   wherein the processor is configured to select a gamma curve corresponding to the metadata from a plurality of gamma curves according to an electro-optical transfer function, and to perform the gamma correction according to the selected gamma curve.

8. The method for projecting the image light beam according to the image signal of claim 7, wherein the metadata includes a static metadata and includes an electro-optical transfer function corresponding to the image signal.

9. The method for projecting the image light beam according to the image signal of claim 8, wherein the metadata indicates that the image signal is corresponded to SDR, HDR or HLG-HDR class.

10. The method for projecting the image light beam according to the image signal of claim 8, wherein the step of converting, by the receiver, the color space of the image signal from the wider color gamut to the narrower color gamut further comprises:
    converting, by the receiver, the color space of the image signal from the wider color gamut to the narrower color gamut according to the electro-optical transfer function.

11. The method for projecting the image light beam according to the image signal of claim 8, wherein the step of performing, by the processor, the gamma correction on the converted image signal according to the metadata to generate the corrected image signal further comprises:
    selecting, by the processor, a gamma curve from a plurality of gamma curves according to the electro-optical transfer function; and
    performing the gamma correction according to the gamma curve.

12. The method for projecting the image light beam according to the image signal of claim 7, wherein the color space corresponds to a color model, and the method further comprises:
    configuring, by the processor, a parameter value corresponding to the color model according to the electro-optical transfer function.

* * * * *